Dec. 18, 1951 M. E. MARTELLOTTI 2,578,713
FLUID PRESSURE BEARING
Original Filed Sept. 30, 1941
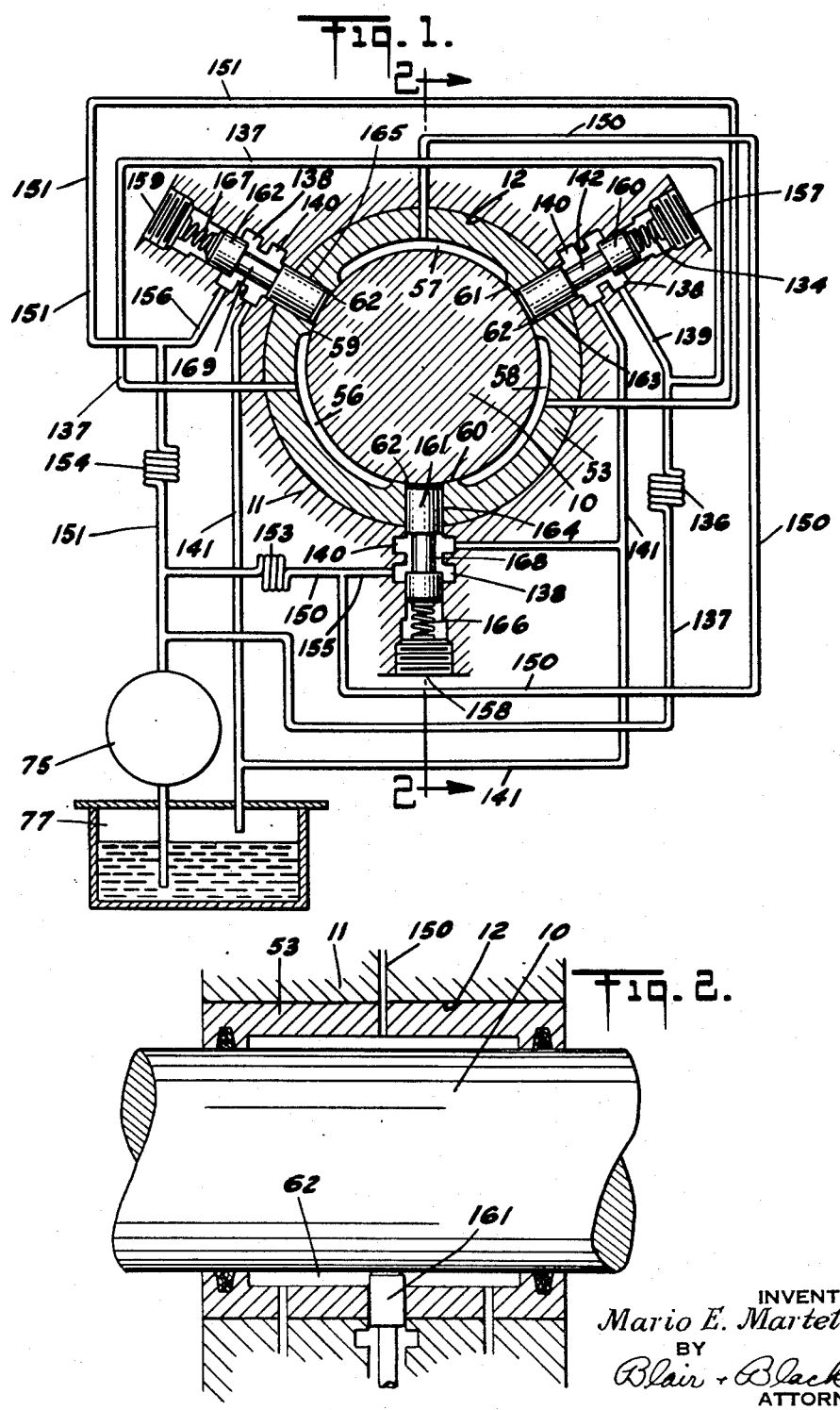
INVENTOR
*Mario E. Martellotti*
BY
*Blair + Black*
ATTORNEYS Patented Dec. 18, 1951

2,578,713

UNITED STATES PATENT OFFICE 2,578,713

FLUID PRESSURE BEARING

Mario E. Martellotti, Cincinnati, Ohio, assignor to The Cincinnati Milling Machine Company, Cincinnati, Ohio Original application September 30, 1941, Serial No. 413,005, now Patent No. 2,459,826, dated January 25, 1949. Divided and this application January 19, 1949, Serial No. 71,710

6 Claims. (Cl. 308—122)

This invention relates to improvements in bearings.

An object of this invention is to provide an improved fluid pressure type of bearing which is automatic in operation in preventing lateral displacements of a journal mounted therein.

Another object of this invention is to provide a bearing which is highly efficient in operation due to low friction losses and which will maintain the journal in the same position with respect to the bearing under both static and operating conditions.

A further object of this invention is to provide auxiliary means for amplifying pressure differentials created in a fluid pressure bearing by decentralizing movements of the journal in order to develop larger force components for opposing such movements.

A still further object of this invention is to provide a bearing in which the auxiliary means for amplifying pressure is directly actuated by movements of the journal.

Other objects and advantages of the present invention should be readily apparent by reference to the following specification, considered in conjunction with the accompanying drawing forming a part thereof, and it is to be understood that any modifications may be made in the exact structural details there shown and described, within the scope of the appended claims, without departing from or exceeding the spirit of the invention.

Referring to the drawing in which like reference numerals indicate like or similar parts:

Figure 1 is a diagrammatic view of a hydraulic control circuit illustrating the principles of this invention; and Figure 2 is a section on the line 2—2 of Figure 1.

This application is a division of my co-pending application entitled "Fluid Pressure Bearing," filed September 30, 1941, and bearing Serial Number 413,005 now Patent Number 2,459,826, issued January 25, 1949.

This invention deals with improvements in bearings of the type in which provision is made for creating a fluid pressure film in the bearing for supporting a journal out of metal to metal contact with the walls of the bearing and means for automatically differentiating the pressure in different parts of the film in response to any lateral shifting of the journal to maintain the journal in the same position regardless of eccentric loading thereon.

In Figures 1 and 2 of the drawing, the reference numeral 10 indicates a journal, and the reference numeral 11 indicates, in general, a bearing housing in which is formed a bore 12. The reference numeral 53 indicates a sleeve fixed in the bore 12 of bearing housing 11. The sleeve 53 is provided with a plurality of pockets 56, 57 and 58 which are uniformly spaced about the journal, and these pockets are supplied with a lubricant under pressure. At the end of each pocket there are lands 59, 60, and 61, the surfaces of which lie in a circle which is slightly larger in diameter than the diameter of the journal to provide a predetermined clearance for the escape of lubricant from the pockets. Each land has a collector groove 62 formed therein, extending longitudinally of journal 10 and equidistantly spaced from the pockets adjacent thereto for collecting and returning fluid to the reservoir 77. The clearance space between the journal and each land constitutes a hydraulic resistance to the escape of fluid from each pocket and it is the amount of this clearance which determines the pressure in any given pocket. In other words, the fluid pressure in the pockets should be sufficient to support the journal and whatever load may be applied thereto in such a manner that the journal is held out of metal to metal contact with the lands and thus floats on the lubricant. Therefore, with a given supply of lubricant per unit of time, it can be computed what the necessary clearance should be to provide a desired normal working pressure in the pockets. The fluid passing through the resistances flows into the collector grooves 62.

In normal operation, the journal 10 will be supported in such position that the spacing between the journal and all of the lands will be substantially uniform, and with this condition prevailing, it should be evident that if the journal should be shifted laterally in any direction due to the application of a transient directional force thereon, that the spacing in the various resistances will be changed, thereby blocking the escape of fluid from some of the pockets and permitting a freer escape of fluid from other pockets, with the result that a pressure differential will be created between the pockets.

In other words, the pressure in the pocket opposite to the direction of the applied force will increase to oppose movement. It will be obvious in this construction that dependence must be placed upon a very small movement of the journal to produce the necessary pressure differential to oppose suddenly applied transient loads on the journal.

When these loads are large, it is difficult to obtain the necessary pressure differential between the pockets by small changes in the value of the hydraulic resistances, and therefore, and in accordance with this invention, auxiliary means have been provided for increasing the amount of the pressure differentials without necessitating an increase in the amount of movement of the journal. To accomplish this, pressure pockets 56, 57 and 58 are connected to pump 75 by supply lines 137, 150 and 151, hydraulic resistances 136, 153 and 154 being positioned in lines 137, 150 and 151, respectively. Lines 137, 150 and 151 are also connected by branch lines 139, 155 and 156 to balancing valves, generally indicated at 157, 158 and 159, which serve to accentuate the pressure differentials between the pockets when the journal 10 is subjected to eccentric loading.

The balancing valves include plungers 160, 161 and 162 which are mounted for radial movement with respect to the axis of sleeve 53 in bores 163, 164 and 165 in bearing housing 11. The inner ends of plungers 160, 161 and 162 bear against journal 10 and each is positioned in the land area 59, 60, 61 diametrically opposite the pocket it controls the pressure in. Plungers 160, 161 and 162 are held in engagement with journal 10 by means of springs 134, 166 and 167 which, resiliently press against the outer ends of the plungers. The longitudinal axes of plungers 160, 161 and 162 are all positioned in a single plane radial to the axis of journal 10, so that each plunger will be directly responsive to the same movement of journal 10 as the plungers positioned opposite thereto.

The plungers 160, 161 and 162 are provided with grooves 142, 168 and 169 which connect the pressure and exhaust ports 138 and 140 of each valve. When the journal 10 is centered with respect to sleeve 53, the grooves 142, 168 and 169 partially close the mouths of ports 138 and thereby control the amount of lubricant bypassing to the reservoir. As each plunger is moved radially by journal 10 with respect to the axis of sleeve 53, ports 138 are opened or closed by the plungers to a degree depending on the amount of movement of the plungers.

Thus, if eccentric loading of journal 10 moves the journal 10 towards pocket 56, the hydraulic resistance to flow of the lubricant across lands 59 and 60 to collector grooves 62 increases. At the same time, spring 134 moves plunger 160 inwardly, further reducing the effective size of port 138 and thus reducing the amount of lubricant bypassed through branch line 141 to the reservoir. Also, at the same time, plungers 161 and 162 move outwardly, increasing the effective size of their exhaust ports 138, thus permitting a greater amount of lubricant from supply lines 150 and 151 to bypass to the reservoir through branch lines 155 and 156. This results in a substantial increase in pressure in pocket 56 to counteract the effect of the eccentric load on the journal.

The fixed hydraulic resistances 136, 153 and 154 serve to divide the flow from the pump proportionately among the three lines 137, 150 and 151 and also serve to prevent a rise in pressure in any of the lines 137, 150 and 151 from kicking back to raise the pressure in the other lines, whereby the lines 137, 150 and 151 may be considered independently restricted channels.

Thus, it will be seen that an efficient and practical control system for a pressure lubricated bearing has been provided which is responsive to any differentiation in pocket pressures to automatically effect an amplification of the pressure differentials with the result that the system may operate at a relatively low pressure but upon any lateral shifting of the journal, a high pressure differential may be immediately obtained to oppose the shift.

As various embodiments may be made of the above invention and as many changes might be made in the embodiments above set forth, it is to be understood that all matter hereinbefore set forth or shown in the accompanying drawing is to be interpreted as illustrative and not in a limiting sense.

I claim:

1. In a fluid pressure bearing, in combination, a pair of interfitting bearing members in which there are circumferentially spaced hydraulic pockets in the bearing surface of one of said members, individual channels for delivering lubricant to the several pockets from a source of lubricant under pressure, there being clearance space between said bearing members to allow for relative movement between said bearing members and to provide resistance to flow from the pockets, and a control valve for each pocket, said control valves being biased toward one of said members and mechanically inter-related therewith to be mechanically actuated directly by relative movements of said bearing members, each channel being connected to one of said control valves, said control valves controlling the amount of pressure in each channel and thus the pressure of the lubricant in said pockets, whereby relative lateral movement of said bearing members with respect to each other acting through said control valves causes an increase in the pressure of the lubricant in the channel or channels leading to any pocket facing the path of such relative movement to oppose it and a decrease in the pressure of the lubricant in the channel or channels leading to any of the pockets not facing said path.

2. In a bearing construction, in combination, a bearing member, a journal mounted on said bearing member, said bearing member having a plurality of pockets therein circumferentially positioned thereon and opening toward said journal, means forming a separate lubricant supply channel for each pocket for supplying lubricant under pressure to each pocket from a source of lubricant under pressure, collector-groove means for collecting lubricant flowing from said pockets, a fixed resistance positioned in each of said channels, and a control valve for each pocket, said control valves being biased toward said journal and mechanically inter-related therewith to be mechanically actuated directly by movements of said journal, each channel being connected to one of said control valves, said control valves controlling the amount of pressure in each channel and thus the pressure of the lubricant in said pockets, whereby relative lateral movement of said journal with respect to said bearing member acting through said control valves causes an increase in the pressure of the lubricant in the channel or channels leading to any pocket facing the path of such relative movement to oppose it and a decrease in the pressure of the lubricant in the channel or channels leading to any of the pockets not facing said path.

3. In a fluid pressure bearing, in combination, a pair of interfitting bearing members in which there are circumferentially spaced hydraulic pockets in the bearing surface of one of said members, individual channels for delivering lubricant to the several pockets from a source of lubricant under pressure, there being clearance space between said bearing members to allow for relative lateral movement between said members and to provide resistance to flow from the pockets, means to control the pressure in said channels including a valve positioned diametrically opposite each pocket biased toward one of said members and mechanically inter-related therewith to be mechanically actuated directly by any lateral movement of said member, each channel communicating with a bleed-off conduit having the flow therethrough controlled by the valve opposite its pocket, whereby said valves upon relative lateral movement of said members cause an increase in the pressure of the lubricant in the channel or channels leading to any of the pockets facing the path of such relative lateral movement to oppose it and a decrease in the pressure of the lubricant in the channel or channels leading to any of the pockets not facing said path.

4. In a fluid pressure bearing, in combination, a bearing member, a journal mounted on said bearing member, said bearing member having a plurality of pockets therein circumferentially positioned thereon and opening toward said journal, individual channels for delivering lubricant to the several pockets from a source of lubricant under pressure, there being clearance space between said journal and sleeve to allow for relative lateral movement therebetween and to provide resistance to flow from the pockets, a fixed hydraulic resistance positioned in each channel, a bleed-off valve positioned diametrically opposite each pocket, each valve including a flow-controlling plunger bearing on said journal, and spring means resiliently urging each plunger into engagement with said journal, each channel being connected through a bleed-off conduit to the valve opposite its pocket to control the pressure in the latter by control of rate of bleed-off flow in said conduit with said valve, whereby said valves upon lateral movement of said journal cause an increase in the pressure of the lubricant in the channel or channels leading to any of the pockets facing the path of such movement to oppose it and a decrease in the pressure of the lubricant in the channel or channels leading to any of the pockets not facing said path.

5. In a fluid pressure bearing, in combination, a bearing member, a journal mounted on said bearing member, said bearing member having three pockets therein circumferentially positioned thereon and opening toward said journal, said pockets being of equal size, equidistantly spaced from each other, and being separated from each other by lands on said bearing member, a collector groove for collecting lubricant flowing from said pockets extending longitudinally of each land, individual channels for delivering lubricant to the pockets from a source of lubricant under pressure, there being clearance space between said journal and said bearing member to allow for relative lateral movement between said journal and said bearing member and to provide resistance to flow from said pockets, a fixed hydraulic resistance positioned in each channel, a valve unit positioned diametrically opposite each pocket and capable of actuation by radial reciprocation, said valve units including mechanism mechanically inter-relating them with said journal for radial reciprocation upon any lateral movement of said journal, each valve unit being connected into a separate bleed-off conduit communicated with only one of said channels to control bleed-off from that channel and the consequent pressures therein, whereby said valve units upon lateral movement of said journal cause an increase in the pressure of the lubricant in the channel or channels leading to any of the pockets facing the path of such movement to oppose it and a decrease in the pressure of the lubricant in the channel or channels leading to any of the pockets not facing said path.

6. In a fluid pressure bearing, in combination, a pair of interfitting bearing members in which there are circumferentially spaced hydraulic pockets in the bearing surface of one of said members, individual channels for delivering lubricant to the several pockets from a source of lubricant under pressure, there being clearance space between said bearing members to allow for relative lateral movement between said members and to provide resistance to flow from the pockets, means to control the pressure in said channels including a valve for each pocket, each valve being biased toward one of said members and mechanically inter-related therewith to be mechanically actuated directly by relative lateral movement of said members, each channel being connected through its valve to an exhaust port, said valves controlling the rate of bleed-off flow from said channels through said exhaust ports, whereby said valves upon relative lateral movement of said members cause an increase in the pressure of the lubricant in the channel or channels leading to any of the pockets facing the path of such relative lateral movement to oppose it and a decrease in the pressure of the lubricant in the channel or channels leading to any of the pockets not facing said path.

MARIO E. MARTELLOTTI.

REFERENCES CITED

The following references are of record in the file of this patent:

UNITED STATES PATENTS

| Number | Name | Date |
| --- | --- | --- |
| 2,062,250 | Moller | Nov. 24, 1936 |